Nov. 3, 1936.  W. SYKES  2,059,824
ELECTRIC WELDING OF TUBING
Filed Nov. 16, 1933

TYPICAL SATURATION CURVE OF SHEET STEEL

INVENTOR
Wilfred Sykes
BY
Clarence D. Kerr
ATTORNEY

Patented Nov. 3, 1936

2,059,824

UNITED STATES PATENT OFFICE 2,059,824

ELECTRIC WELDING OF TUBING

Wilfred Sykes, Chicago, Ill., assignor, by mesne assignments, to Direct Current Welding Company, a corporation of Delaware Application November 16, 1933, Serial No. 698,247

7 Claims. (Cl. 219—6)

This invention relates to the welding of tubing. More particularly, the invention pertains to that type of welding wherein stock formed into tubular shape with the edges thereof adjacent each other, is continuously advanced through a welding throat comprising members whereby the edges of the stock are pressed together and an electric current is passed across the seam formed by the adjacent edges, with resultant welding of the stock into a tube. Briefly reviewing the history of this art, such welding was for many years carried out by alternating current as exemplified by the patent to Parpart, No. 658,741. When increased production later became desirable and the speed of travel of the tube stock through the welding throat was increased, the alternating current produced a "stitch" effect, wherein more perfectly welded portions of the tube corresponding to the maximum values of the periodically varying current alternated with less perfectly welded portions corresponding to the minimum current values, as noted in the Johnston Patents Nos. 1,388,434 and 1,435,306. Thus with alternating current of the standard 60-cycle frequency and a speed of travel of the tube stock through the welding rollers of 60 feet per minute, there resulted ten "stitches" per inch in the welded tube, each stitch corresponding to a maximum value of the recurrently varying welding current. While the non-uniform character of the stitch weld could be avoided by employing direct current, the workers in the art long regarded the continuous welding of seamed tube stock by direct current as unattainable because they did not deem it possible to produce the requisite high-amperage low-voltage direct current. The currents required in this type of welding are of the order of several thousand amperes, frequently 10,000 to 25,000 amperes or higher; while the voltages are of a comparatively low order, frequently from two to six volts. As shown by my Patent No. 1,920,900, dated August 1, 1933, continuous welding of tubing may be effectively carried out at high speeds, and a uniform and stitch-free weld produced, by supplying to the welding rolls the current developed by a separately-excited direct-current generator. So far as I am aware, however, no one prior to my present invention has discovered how tube welding may be carried out with a direct-current generator of the self-excited type.

This invention has for its object the attainment of direct-current welding of tubing through a self-excited generator. The invention provides a self-excited direct-current generator adapted to maintain stability of operation while supplying the requisite high-amperage low-voltage current, despite variations in the welding conditions. More specifically, an outstanding feature of my invention comprises a self-excited generator provided with an abnormally strong shunt field winding and particularly distinguished from previous self-excited machines by the fact that the shunt field winding is capable of providing continuously for at least five times the number of ampere turns required to give the minimum stable operating voltage. Other features and advantages of the invention will be hereinafter described and claimed.

Figure 1:
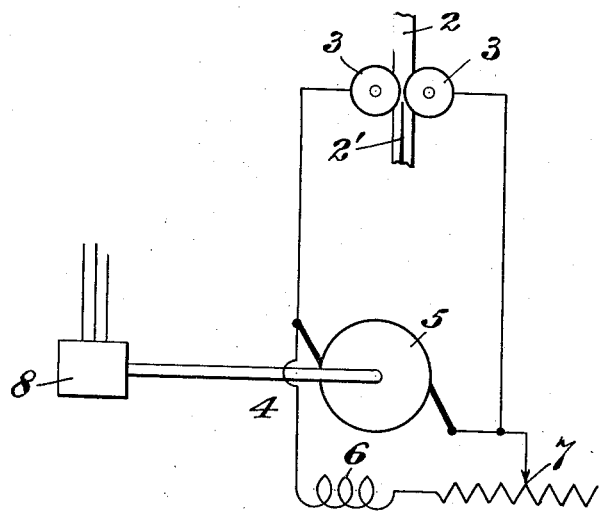
Fig. 1 is a diagrammatic view illustrating a generator of the type with which my invention is concerned, connected to the electrode rolls of a tube welding apparatus.

Referring to the drawing, there is indicated at 2 a portion of a tube traveling through a welding throat of any suitable type. Such throat may, for example, comprise a pair of horizontal rolls 3, 3, having peripheries curved for receiving the tube stock; said rollers serving to support the stock, to compress the latter to bring into firm contact the edges of the seam cleft 2' to be welded, and to pass electric current across the seam edges for welding the latter. The tube may be driven through the welding throat in the usual way. Customarily the tube is formed from flat stock or skelp into tubular form with its edges adjacent each other, through motor-driven forming rolls which both shape the stock as aforesaid and advance it through the welding throat. Any suitable driving means may, of course, be employed.

For supplying current of substantially constant value to the welding rolls 3, 3, to thereby cause the tube walls on opposite sides of the seam to be formed into a continuous and uninterrupted weld, I have shown a direct-current shunt generator 4; the armature of which is designated 5 and the shunt field winding 6. The winding 6 is such that at the minimum voltage that must be delivered, the number of the magnetic flux lines of the field is in that portion of the saturation curve that corresponds to stable operation, and said winding is further such as to provide at least five times the number of ampere turns required to give the minimum stable operating voltage. For example, referring to the typical saturation curve of sheet steel shown in Fig. 2 (wherein the abscissae designate ampere turns per inch of length of the metal circuit containing the field flux lines, and the ordinates indicate the number of lines of magnetic flux per square inch in said circuit) the machine may be built so that the minimum voltage that must be delivered will be obtained with about 100,000 flux lines per square inch. This value of the flux lines, it will be noted, lies in the "knee" portion of the saturation curve, wherefore operation at said minimum voltage is stable. As will be noted from the curve, approximately 80 ampere turns per inch of length of the steel in the magnetic circuit of the field are sufficient to produce the flux aforesaid. If now the field winding be sufficient to enable 2,000 ampere turns per inch of length aforesaid to be employed, the resultant magnetic flux density corresponding to said 2,000 ampere turns would be about 160,000 lines per square inch, and the voltage, which is proportional to the flux density, would exceed the aforesaid minimum voltage by about 60%. In short, if, for example, the machine were designed to give three volts as a minimum at approximately 100,000 flux lines per square inch and be provided with a winding capable of carrying say 25 times the number of ampere turns required to produce said minimum voltage, a maximum voltage of 4.8 could be obtained. Within this range the voltage can be readily varied through a conventional rheostat such as indicated at 7, and stable operation retained. By "stable operation", I mean that the voltage will not vary undesirably when the load on the armature is changed rapidly from zero to the full capacity of the generator.

Figure 2:
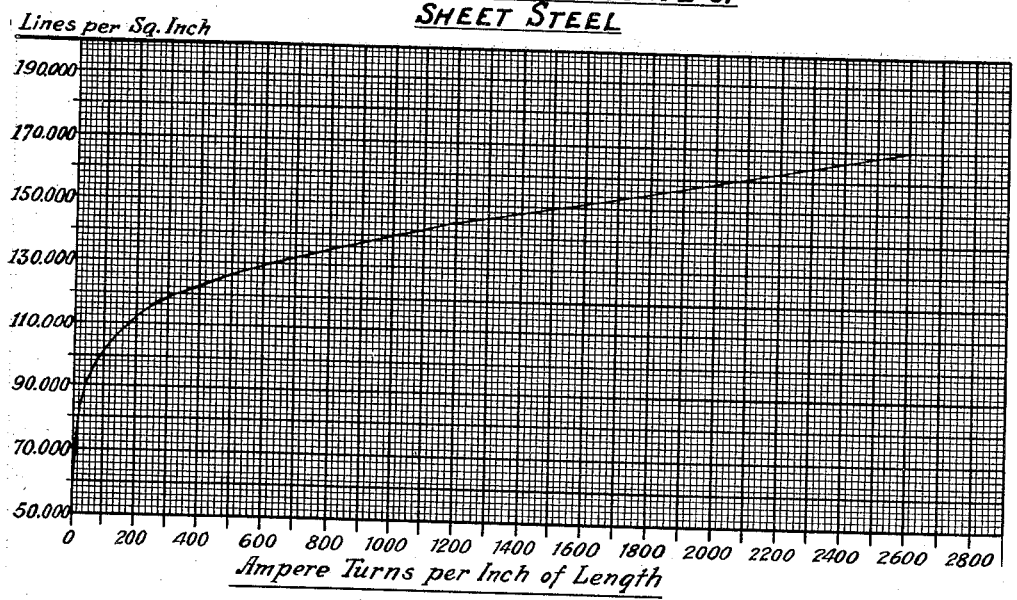
Fig. 2 is a diagram showing a typical saturation curve for sheet steel; illustrating the relation between ampere turns and the magnetic flux produced with this material.

It will of course be understood that the saturation curve in Fig. 2, as well as the flux densities, voltages, and ampere turns above specified are merely illustrative. The actual flux density in any given machine will, of course, depend upon the kind of material employed in the field and other design factors. The number of times the ampere turns at maximum voltage exceed the ampere turns at minimum voltage may vary with the character of the material being welded and with other factors such as the wall thickness of such material. However, in order that the generator may provide the requisite regulation its field winding should be such as to provide for at least five times the number of ampere turns requisite to give the minimum stable operating voltage. The generator forming the subject of this invention is, in short, distinguished from prior generators by its abnormally strong field winding and particularly by a field winding of such strength that it is capable of providing continuously for at least five times the minimum number of ampere turns required to give stable operation. The strong field above indicated is wholly abnormal for standard work, but results in the provision of a generator particularly adapted to the welding of various types of tubing.

The speed of travel of the tube through the welding throat may be varied as desired, by regulating the speed of the motor which drives said tube, and thereby the range of operating conditions obtainable with the voltage control above set forth may be further increased.

In addition, the range of voltage control may be increased by varying the speed of rotation of the generator armature 5. For this purpose, said armature is shown driven by an electric motor 8, the speed of which may be varied in any of various ways well known in the art. With provisions for varying the armature speed the field winding 6 aforesaid need not be so strong as outlined hereinbefore, since if the strength thereof be reduced the diminution in range of stable operating voltages corresponding to such reduction may be compensated and said range extended by variation in the speed of said armature.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes.

2. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes, said generator having a shunt field winding of such character as to provide at least five times the number of ampere turns required to give stable operation.

3. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a shunt-wound direct-current generator connected to said electrodes.

4. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes, said generator having a shunt field winding of such character as to provide at least five times the number of ampere turns required to give stable operation, and adjustable rheostat means for varying the current through said winding.

5. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes, and means for varying the speed of rotation of the armature of said generator.

6. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes, and means for varying the strength of the field of said generator to regulate the voltage supplied thereby.

7. In apparatus for electrically welding a tube blank, a pair of welding electrodes with respect to which said tube is movable and adapted to engage the tube on opposite sides of the seam to be welded, and means for supplying to said electrodes a direct current of substantially constant value for thereby causing the walls on the opposite sides of the seam to be formed into a continuous and uninterrupted weld, said means comprising a self-excited direct-current generator connected to said electrodes, and means providing for regulation of the voltage of said generator throughout a range corresponding to points on the saturation curve corresponding to stable operation and spaced from each other an extent corresponding to at least five times the number of ampere turns of the field at the minimum stable operating voltage.

WILFRED SYKES.